Patented Nov. 27, 1923.

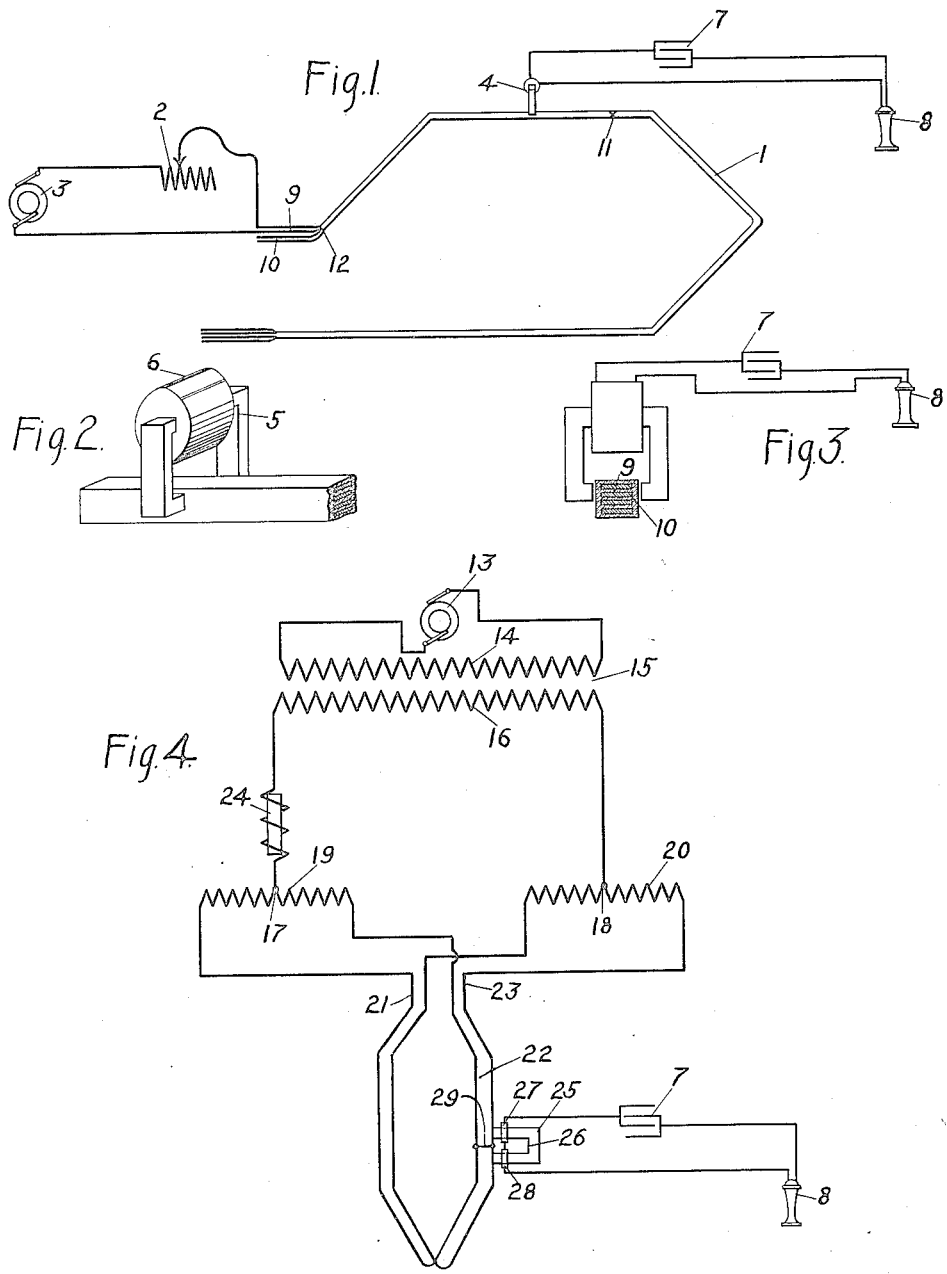

1,475,749

UNITED STATES PATENT OFFICE.

LEWIS WARRINGTON CHUBB, OF PITTSBURGH, PENNSYLVANIA, ASSIGNOR TO WESTINGHOUSE ELECTRIC & MANUFACTURING COMPANY, A CORPORATION OF PENNSYLVANIA.

TESTING DEVICE.

Application filed March 9, 1918. Serial No. 221,396.

*To all whom it may concern:*

Be it known that I, LEWIS WARRINGTON CHUBB, a citizen of the United States, and a resident of Pittsburgh, in the county of Allegheny and State of Pennsylvania, have invented a new and useful Improvement in Testing Devices, of which the following is a specification.

My invention relates to testing devices and particularly to methods of, and means for, testing armature coils for the purpose of ascertaining the location of short-circuits therein.

The object of my invention is to provide a testing device, of the above-indicated character, that shall be simple and inexpensive to construct and effective in its operation.

It is desirable to test armature and other similar coils for short circuits before they are assembled in the complete armature in order that they may be repaired, if defective, without injury to the armature and adjacent coil.

In view of the above, I provide means for impressing a high-frequency voltage upon the conductors of the coil, an exploring coil that is adapted to be moved along the coil to be tested, and means for indicating when voltage is induced in the exploring coil. According to the arrangement of impressing the voltage upon the coil, the indicating device may be caused to indicate either when the exploring coil is adjacent the short circuit or when it is in any position other than that adjacent the short circuit. With such a device, the position of the short-circuit may be readily determined in order that the coil may be repaired at a minimum expense.

In the accompanying drawings, Figure 1 is a diagrammatic view of a testing device embodying my invention; Fig. 2 is a perspective view of a portion of the testing device shown in Fig. 1; Fig. 3 is a front elevational view of a portion of the testing device shown in Fig. 1; and Fig. 4 is a diagrammatic view of a modified form of testing device embodying my invention.

An armature or other similar coil 1 to be tested for short-circuits between its conductors is operatively connected, through a resistor 2, to a source 3 of relatively high-frequency electromotive force. An exploring device 4, comprising a magnetizable member 5 of substantially U-shape and a winding 6, is adapted to be moved along the coil 1 and is operatively connected, through a condenser 7, to an electro-responsive device 8, such as a telephone receiver or other similar device.

Since the source 3 of electromotive force is connected to two conductors of the coil 1, and since, under ordinary conditions, the two conductors are not connected together, no current will traverse the same, and, if the exploring device is moved along the coil 1, no voltage will be induced in the winding 6 and, consequently, the diaphragm (not shown) of the receiver 8 will not vibrate. However, if the two conductors 9 and 10 of the coil are short-circuited at any point, such as the point 11, for example, current will traverse the same and, when the exploring device 4 is moved along that part of the coil 1 between the point 11 and the terminals 12, sufficient voltage will be induced in the winding 6 to cause the receiver 8 to emit an audible signal. When the device 4 passes the point 11, no voltage will be induced in the winding 6 and the signal will become inaudible. Thus, the point on the coil 1 at which the receiver 8 fails to give an audible signal is the location of the short circuit. When this point is known, the insulation from the coil 1 may be removed at this point only and the same repaired without the necessity of replacing the insulation of the entire coil.

In Fig. 4 of the drawings, a relatively high-frequency source 13 of electromotive force is connected to the primary winding 14 of a transformer 15 the secondary winding 16 of which is connected to the mid points 17 and 18 of the resistors 19 and 20, respectively. The terminals of the resistor 19 are connected to the conductor 21 of an armature coil 22 that is to be tested, and the terminals of the resistor 20 are connected to a conductor 23 of the coil 22. A reactor 24 is connected between the point 17 of the resistor 19 and the secondary winding 16 of the transformer 15. An exploring device 25, comprising a core member 26 of substantially U-shape and two oppositely connected windings 27 and 28, is adapted to be moved along the coil 22. The resistors 19 and 20 are so connected to the conductors 21 and 23 that the voltages impressed thereacross are in opposition to one another.

Since the voltages impressed upon the conductors 21 and 23 are in opposition to each other, no voltage will be induced in the windings 27 and 28 of the exploring device 25 when the same is moved along the coil 2, under normal conditions and thus no audible signal will be produced. However, if the conductors 21 and 23 are short-circuited at any point, such, for example as point 29, when the device 25 is so disposed that the legs of the core member 26 are on opposite sides of the point 29, as shown in the drawing, the voltage induced in windings 27 and 28 will assist each other to cause the diaphragm (not shown) of the receiver 8 to vibrate and thereby produce an audible signal. When the device 26 is disposed in other positions under short-circuit conditions the current in the windings 27 and 28 will neutralize each other and no audible signal will be produced.

The condenser 7 is of such capacitance that the circuit of the receiver 8 is tuned to the normal frequency of the generators supplying voltage to the testing device. By constituting the receiver circuit a tuned circuit, a relatively small induced voltage in the windings of the exploring device will cause the receiver 8 to produce an audible signal.

My invention is not limited to the specific structures illustrated, as various modifications may be made therein without departing from the spirit and scope of the invention, as set forth in the appended claims.

I claim as my invention:

1. The method of testing an armature coil for short circuits which consists in connecting two conductors of the coil to a source of alternating electromotive force in opposition to each other and causing a differentially wound testing instrument tuned to the frequency of said alternating-current source to be passed therealong to determine the point of short-circuit between the conductors.

2. The method of testing an armature coil for short circuits which consists in connecting two conductors of the coil to a source of alternating electromotive force in opposition to each other and causing a differentially wound testing instrument of predetermined frequency-responsive relation to said source to be passed along the coil to determine the point of short-circuit between the conductors.

3. The method of testing a two circuit armature coil for short-circuits which consists in connecting one circuit to one terminal of a source of alternating current and the other circuit to the other terminal of the source of alternating current and causing a differentially wound testing instrument to be passed along the coil to determine the point of short-circuit between the conductors of the coil.

4. The method of testing a multi-circuit armature coil for short-circuits which consists in so differentially connecting portions of the coil to a source of alternating current that, with no fault therein, no current traverses the coil and, when a short-circuit obtains therein, current traverses the coil, and causing a differentially-wound testing instrument responsive to a predetermined frequency to be passed therealong to indicate the position of the short-circuit.

5. A device for testing two-circuit armature coils for short-circuits comprising a source of alternating current, means for so connecting the coils to the source of alternating current that no current traverses the circuits under normal conditions, and means for determining when current traverses the circuits of the coil.

In testimony whereof, I have hereunto subscribed my name this 28th day of Feb., 1918.

LEWIS WARRINGTON CHUBB.